March 17, 1970    T. W. KRAMER III    3,501,195
SUSPENDED LOAD TRANSPORT TRAILER
Filed June 26, 1967     3 Sheets-Sheet 1
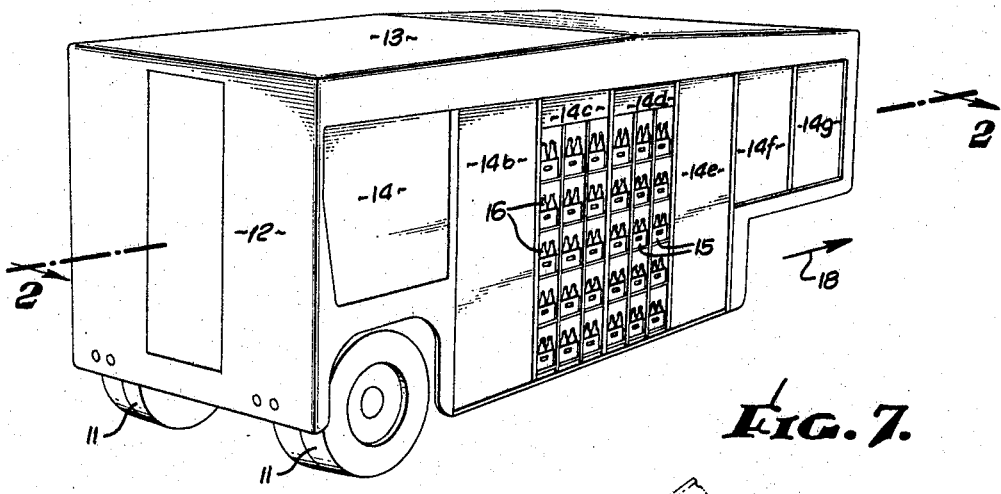
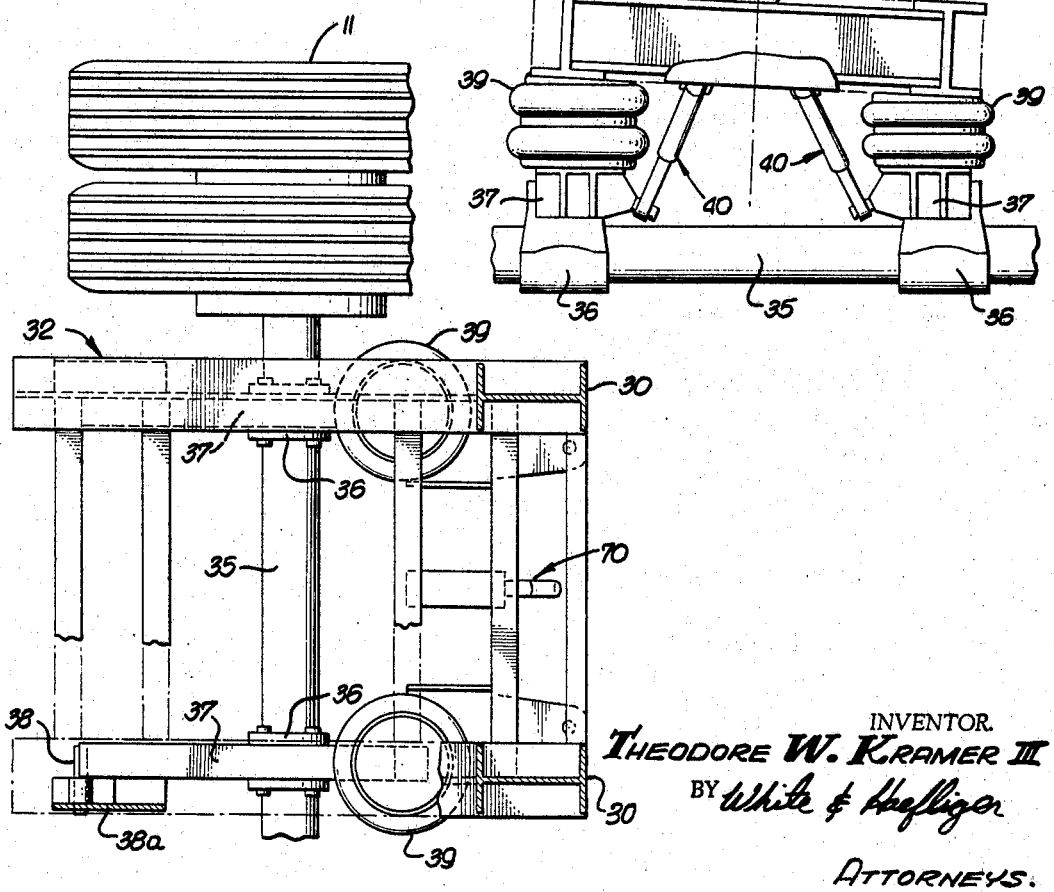
INVENTOR.
THEODORE W. KRAMER III
BY White & Haefliger
ATTORNEYS.

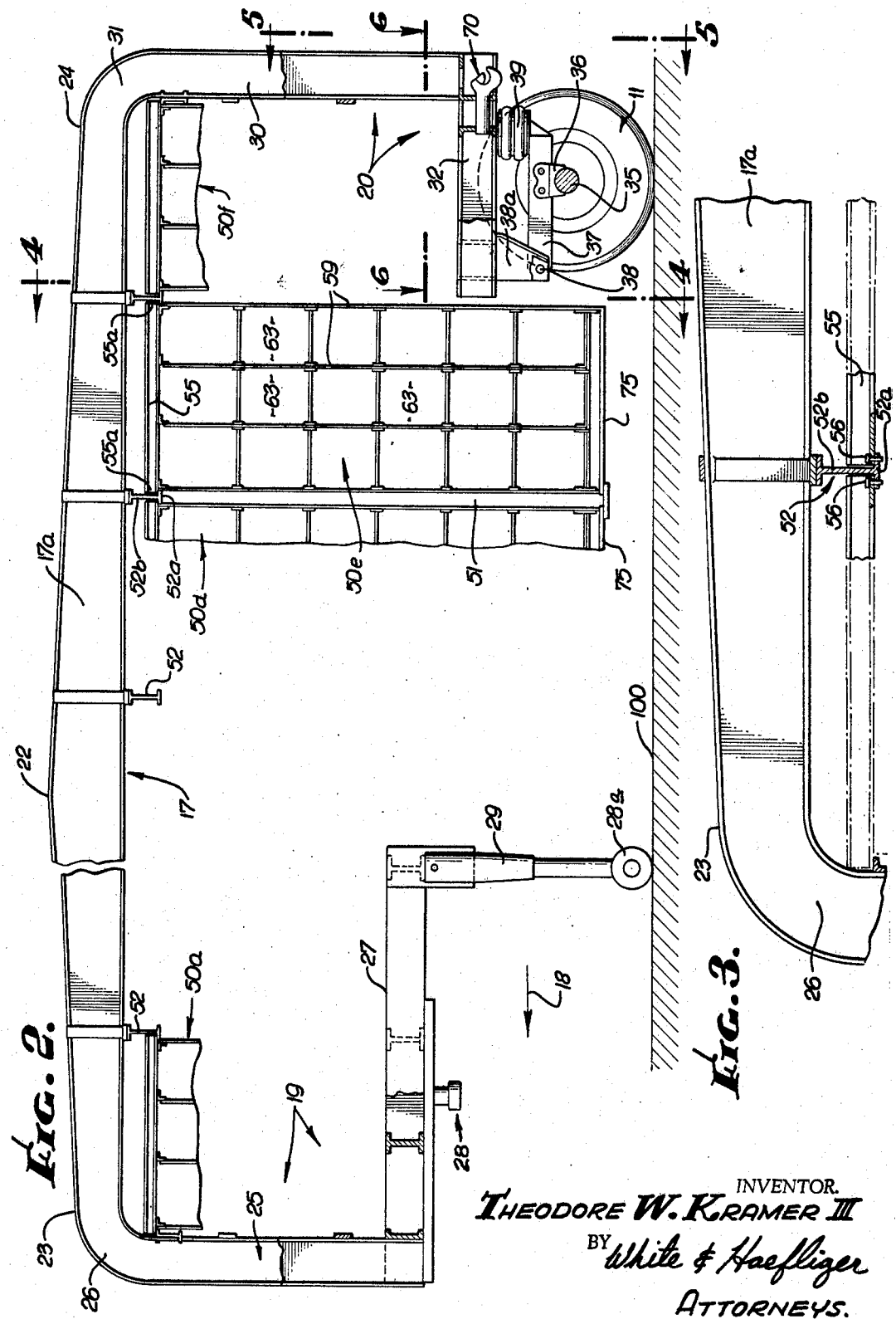

March 17, 1970 T. W. KRAMER III 3,501,195
SUSPENDED LOAD TRANSPORT TRAILER
Filed June 26, 1967 3 Sheets-Sheet 3

INVENTOR.
THEODORE W. KRAMER III
BY White & Haefliger
ATTORNEYS.

United States Patent Office 3,501,195
Patented Mar. 17, 1970

3,501,195
SUSPENDED LOAD TRANSPORT TRAILER
Theodore W. Kramer III, 6826 Topke,
Tucson, Ariz. 85715
Filed June 26, 1967, Ser. No. 648,807
Int. Cl. B62d 33/04
U.S. Cl. 296—28            16 Claims

ABSTRACT OF THE DISCLOSURE

The disclosed transport vehicle incorporates an integral frame having elongated upper beam structure supported by forward and rearward frame columns, which are in turn supported as by wheel structure. Various load carrying structures, as for example container case racks, pallets, platforms, etc., are suspended from the upper beam structure between the forward and rearward columns, to provide ease of access to the load and full utilization of space.

BACKGROUND OF THE INVENTION

This invention relates generally to transport vehicles, and more particularly concerns systems for transporting suspended loads in association with trailers or trucks.

In the past, bottle cases have been loaded on delivery truck or trailer body decks which extend generally horizontally and lengthwise of the vehicle, for outward exposure of the outer cases. This presents the difficulty of gaining access to the cases stored interiorly of the body, and considerable time and effort is expended by the driver or route man in climbing on and over the body, and in reaching into the body interior to gain access to a wanted case, or to shuffle loaded and unloaded cases. The problem is typically aggravated by the many different soft drink packages or bottles that must be carried on a truck or trailer.

SUMMARY OF THE INVENTION

It is a major object of the present invention to provide a transport vehicle and a system for loading receptacles or cases on the vehicle and for unloading such cases, as will eliminate the above referred to problems, as well as others that arise in the environment to be described. Basically, the invention is embodied in a transport vehicle and combination that includes a vehicle frame having upper beam structure elongated in the direction of vehicle travel and also having longitudinally spaced forward and rearward portions supporting the upper beam structure and interconnected via the beam structure; means for supporting the forward and rearward portions during travel of the frame; and load carrying structure (such as container or case carrying rack structure) supported by the beam structure in such suspended relation that the bulk of the loading (and preferably the entire loading) exerted by the load carrying structure is transmitted by the upper beam structure. When the rack structure is utilized, it forms multiple laterally extending channels accessible at their laterally opposite ends for loading of the containers into the channels at one end of the frame and for unloading of the containers at the opposite side of the frame.

Typically, the rack structure includes multiple longitudinally spaced racks suspended from the beam structure at longitudinally spaced locations such that gaps of increasing size are formed between the racks as the beam structure flexes downwardly in response to loading exertion. Accordingly, the greater the load, the less tendency of the racks to swing and impact together. Further, the forward portion of the frame typically includes a forward beam or column extending downwardly from the upper beam structure, and a forward platform extending rearwardly from a lower extent of the forward beam, the rack structure extending between the forward platform and the upper beam structure. Likewise, the rearward portion of the frame typically includes a rearward beam or column extending downwardly from the upper beam structure and a rearward platform extending forwardly from a lower extent of the rearward beam, the rack structure extending between the rearward platform and the upper beam structure.

Further, there are container support surfaces on the racks defining paths of container movement in the channels and sloping downwardly from one side of the frame to the opposite side of the frame; and such surfaces are typically defined by rollers, there being gates at opposite ends of the channels to limit container travel in the channels.

Other objects and advantages of the invention include the inclusion in the upper beam structure of two laterally spaced, longitudinally extending, substantially parallel beams, typically of I-shaped cross-section and being of variable height along the beam length to provide a substantially constant moment of force loading along the beam length; the provision of laterally extending beams carried by the elongated upper beam structure at longitudinally spaced locations such that the racks may be individually suspended from the laterally extending beams (enabling loading of the racks in a warehouse for later loading and suspension on the trailer beam structure); the provision of compressible fluid containing enclosures through which loading is transmitted from the rear portion of the frame to ground engaging wheel structure, as will be described; and the provision of such load carrying structures as a movable platform, monorail, pallet and roller conveyor.

These and other objects and advantages of the invention, as well as the details of illustrative embodiments, will be more fully understood from the following detailed description of the drawings, in which:

BRIEF DESCRIPTION OF THE DRAWINGS

FIG. 1 is a perspective view of one preferred embodiment of the trailer vehicle;

FIG. 2 is a side elevation taken on line 2—2 of FIG. 1, showing the frame of the trailer including longitudinal and lateral beams for suspending racks;

FIG. 3 is an enlarged side elevation of a forward portion of the upper beam structure and lateral beams;

FIG. 6 is a horizontal section taken on line 6—6 of FIG. 2;

FIG. 7 is a view like FIG. 5, but showing the manner in which the frame may be tilted.

DESCRIPTIONS OF THE PREFERRED EMBODIMENT

Figure 4:
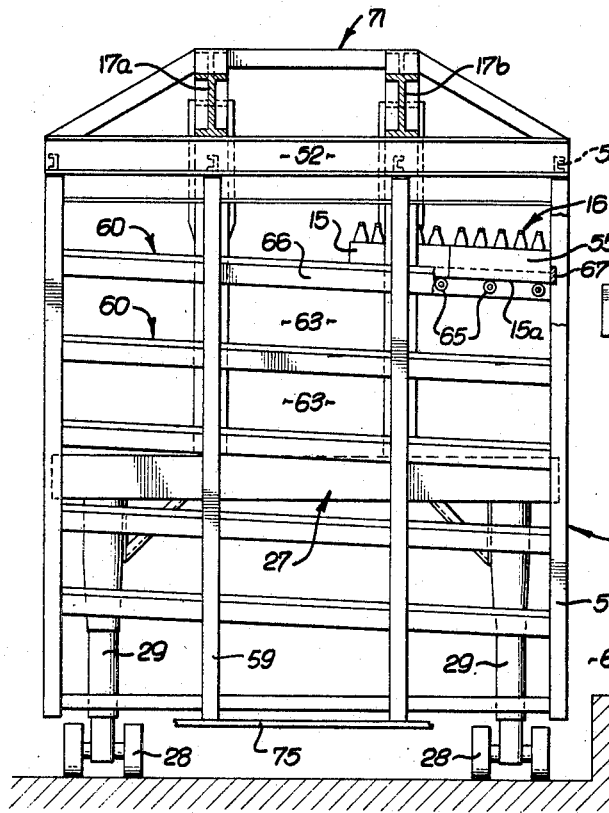
FIG. 4 is a vertical section taken on line 4—4 of FIG. 2.

Referring first to FIG. 1, a transport vehicle is shown at 10 in the form of a trailer. The latter has rear wheels 11 and a body delineated by the rear and top panels 12 and 13, and side doors 14a–14g. The doors may be slid upwardly, individually as shown for example by doors 14c and 14d, thereby to expose containers such as cases 15 in which groups of full or empty bottles 16 are retained. Such cases are exposed at the right side of the trailer, for unloading; similar door structure at the opposite or left side of the trailer is manipulable to expose the individual channels in the rack structure (as will be described) for loading of bottle cases into such channels.

Extending the description of FIG. 2, the trailer incorporates a frame having upper beam structure generally indicated at 17 as elongated in the direction 18 of vehicle travel. The frame also has longitudinally spaced forward and rearward portions 19 and 20 supporting the upper beam structure and interconnected via the latter. The upper beam structure 17 typically includes two laterally spaced, longitudinally extending, substantially parallel beams 17a and 17b, as better seen in FIG. 4. Each of these has I-shaped cross section, and may advantageously be of variable height along its length to provide a substantially constant moment of force loading along its length, regardless of the loaded or unloaded condition of the racks 50 suspended from the beam structure, as will be described. Accordingly, the racks tend to maintain some vertical spacing therebetween, as indicated at 51 between racks 50d and 50e in FIG. 2. This is important during such travel of the trailer over uneven surfaces as tends to cause the beam structure 17 to deflect. Gaps 51 tend to widen as beams 17 flex downwardly under load. Minimum widths of gaps 51 are about two inches. In this regard, note the tapering of the beams 17a and 17b from longitudinal center at 22 forwardly to location 23, and from longitudinal center rearwardly to location 24. Beam vertical dimensions at locations 23 and 24 may typically be about ten inches.

The forward portion 19 of the frame includes two forward beam columns 25 having curved upper portions 26 merging with the upper beams 17a and 17b at locations 23 to extend downwardly therefrom. Also, forward portion 19 includes a forward platform 27 extending rearwardly from the lower extent of the beam columns 25, with width approximately the same as the overall trailer width as seen in FIG. 1. Means to support the forward portion 19 typically includes so-called fifth wheel structure 28 and landing gear 29 attached to the platform 27. The rearward portion 20 of the frame includes two rearward beam columns 30 having curved upper portions 31 merging with the upper beams at locations 24 to extend downwardly therefrom. Also, rearward portion 20 includes a rearward platform 32 extending forwardly or backwardly from the lower extent of the beam column 30, with width approximately the same as the overall trailer width as seen in FIG. 1

Means to support the rearward portion 20 typically includes the side by side wheel pairs 11 suspended as shown. As seen in FIGS. 2, 5–7, the wheel axle 35 is connected at 36 to transversely spaced levers 37, each of which is pivotally connected to the platform 32 as by pivot 38 and plate 38a, so that the lever extends generally horizontally and rearwardly from the pivot, but below the platform. Pneumatic springs 39 are interposed between the rearward ends of the levers and the platform, so as to compressively resist counterclockwise pivoting of the levers as seen in FIG. 2. Shock absorbers 40 are also connected between the levers and the platform, as best seen in FIG. 7. The use of dual pneumatic springs as shown enables controlled tilting of the trailer frame and of the racks 50, for controlling inclination of the channels in the racks along which the bottle cases are movable during loading and unloading. For example, as seen in FIG. 7, the pneumatic spring 39 to the right of the vertical longitudinal center plane 41 through the trailer may be partially deflated to tilt the platform 32 and the remainder of the frame in a clockwise direction, to precisely controlled extent. Such tilting assists loading or unloading of cases particularly in environments where, for example, the roadway is tilted in the opposite direction and it is desired to counteract the effect of such roadway tilting to allow discharge of bottle cases from the racks and at the right or curb side of the trailer.

The beam and platform structure as described is unusually well adapted to support container carrying rack structure 50, in the manner now to be described. In this regard, the bulk of the loading transmitted by the racks 50a–50e is carried by the upper beam structure 17. Such carriage is facilitated by the laterally extending beams 52 carried by or suspended from the upper beams 17a and 17b as seen in FIGS. 2–4. I-beams 52 are located at longitudinally spaced intervals so that the overhanging ends 55a of the rack beams 55 may ride onto the lower plates 52a of the I-beams 52, the vertical plates 52b closely confining the ends of the rack beams 55 so that the latter may not drop off the plates 52a. In addition, the rack beams may be pin or bolt connected to the I-beams 52 as at 56, in such manner as to facilitate easy installation on and removal of the racks off the I-beams 52. Such installation may be effected, for example, after a rack has been preloaded with bottle cases in a warehouse. Removal of an entire rack, filled with cases, may be desired at a bottle delivery point such as a volume distribution center. At the same time, a rack filled with empty bottles may be installed on the trailer as by sliding the rack beams 55 onto the I-beams 52, in a lateral direction.

Referring to FIGS. 1 and 4, a typical rack 50e includes uprights 59 supporting multiple, parallel, conveyor chutes 60 slightly inclined from horizontal when the rack beams 55 extend horizontally. The inclination is downward toward the curb side 61 of the trailer, as illustrated, and further the chutes 60 extend between opposite sides of the trailer. Accordingly, the bottle cases 15 travel or gravitate along the chutes and in a downward direction, automatically, during loading and unloading. Such travel occurs in the channel 63 formed between vertically spaced chutes.

As seen in FIG. 4, each of the chutes has a receptacle or case support defining an inclined plane, indicated as coextensive with the bottom surfaces 15a of the cases. Such surfaces are typically defined by the tops of rollers 65 axle mounted between chute side members 66. The cases are guided to travel in sequence in a downhill direction, between side members 66. At the lower end of the chute, a gate plate 67 projects into the path of case downhill travel to block further travel of the end case. Removal of the case from the chute is effected by lifting it over the gate. In addition, a similar gate may be provided at the higher end of the chute. Note also the fact that the racks 50c–50e extend downwards into close proximity to the ground 100, to enable maximum utilization of deck space.

To complete the description, a trailer connection such as a hook 70 is provided for connecting another trailer to be handled as doubles; bracing members are indicated at 71 in FIG. 4; and closure plates 75 are connected with the undersides of the racks to protect them against contact with rocks, dirt and dust beneath the trailer. Note also that shorter racks 50a and 50f fit between the upper beam structure and the platforms 27 and 32, to provide full utilization of available space. Doors 14a–14g may typically be raised to be rolled or to be guided on rails projecting in the spaces between the tops of the rack beams 55 and the undersides of the upper beam structure.

Outer uprights 59 may be channeled to vertically guide the doors. Thus the doors in raised positions extend either horizontally or in rolled condition. When all doors are raised, the cases on the truck at the ends of the chutes are readily visible, for checking. When each channel contains bottled beverage of only one type (different channels containing beverage of different type) the supply of different types of beverage can be rapidly determined. Also, each beverage is immediately available at the lower end of at least one channel. Finally, empty cases may be loaded at the higher ends of the channels, without disturbing supply of full bottle cases at the lower ends of the channels.

Figure 8:
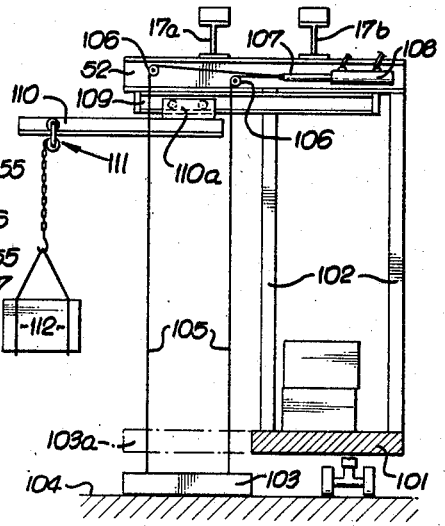
FIGS. 8 and 9 are sections showing alternate load supports.
Figure 5:
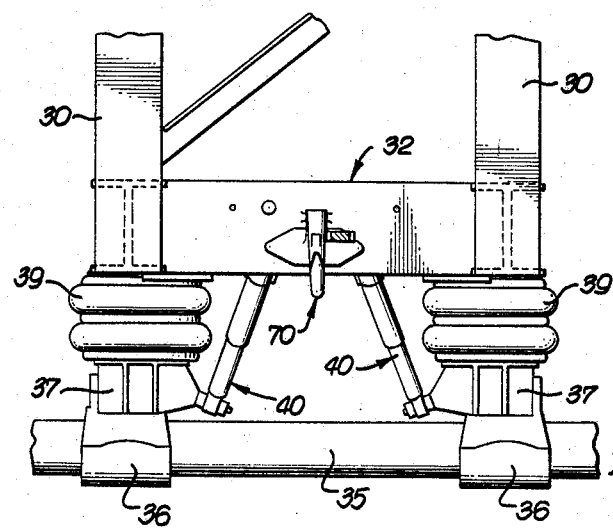
FIG. 5 is an end view taken on line 5—5 of FIG. 2.

FIG. 8 illustrates a modified load carrying structure supported by the upper beam structure 17a and 17b, via the laterally extending beam 52 arranged as described in FIG. 2. Such load carrying platform includes a deck 101 suspended from the beams 52 via uprights 102, and a load carrying platform 103 which may be dropped from upper position indicated by broken lines 103a, to lower position on the ground 104. This enables ease of loading containers or other objects onto the lowered platform, which may then be raised to upper position to allow horizontal shifting of objects onto deck 101. A suitable actuator means for lifting and lowering the platform may include the vertical cables 105 which are turned by pulleys 106 for attachment to the plunger 107 of a fluid actuator 108. Elements 106, 107 and 108 are carried by the beam 52.

Another load carrying structure seen in FIG. 8 includes lateral rails 109 and 110 suspended from the upper beam structure as by the beam 52. Rail 109 is fixed, whereas rail 110 is suspended from rail 109 as via a truck 111, to enable lateral displacement of rail 110. A carrier 111 is movable laterally on rail 110, and may incorporate a hoist for laterally transporting loads 112 onto and off the vehicle.

Figure 9:
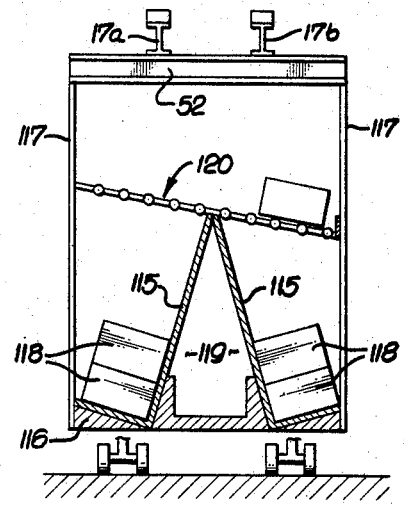

FIG. 9 illustrates another modified load carrying structure supported by the upper beam structure 17a and 17b via the laterally extending beams 52, arranged as described in FIG. 2. In this case, pallets 115 are suspended from beam 52 as by deck structure 116 and uprights 117, as shown. The pallets facing laterally toward the sides of the vehicle for reception of loads 118. Space 119 between the pallets is also available for loads. A roller conveyor 120 is carried by uprights 117 and extends laterally at an incline, and at a higher elevation than the pallets. Loads rolling downwardly on the conveyor may be lifted off and dropped onto the pallets, as indicated.

I claim:
1. In a container transport vehicle, the combination comprising
   a frame having upper beam structure elongated in the direction of vehicle travel and also having longitudinally spaced forward and rearward portions supporting said upper beam structure and interconnected via said beam structure, the frame including laterally extending supports carried by the upper beam structure and at longitudinally spaced locations,
   means for supporting said forward and rear portions during travel of the frame in said direction,
   and container carrying rack structure supported by said laterally extending supports in such suspended relation that the bulk of the loading exerted by the rack structure and containers is carried by the upper beam structure,
   the rack structure forming multiple laterally extending channels accessible at laterally opposite ends thereof for loading of the containers into the channels at one side of the frame and for unloading of the containers from the channels at the opposite side of the frame.
2. The combination of claim 1, in which said rack structure includes multiple longitudinally spaced racks suspended from said beam structure at longitudinally spaced locations such that gaps of increasing size are formed between the racks as the beam structure flexes downwardly in response to said loading exertion.
3. The combination of claim 1, in which said forward portion of the frame includes a forward beam column extending downwardly from the upper beam structure and a forward platform extending rearwardly from a lower extent of the forward beam, said rack structure extending between said forward platform and the upper beam structure.
4. The combination of claim 1, in which said rearward portion of the frame includes a rearward beam column extending downwardly from the upper beam structure and a rearward platform extending forwardly from a lower extent of the rearward beam, said rack structure extending between said rearward platform and the upper beam structure.
5. The combination of claim 3, in which said rearward portion of the frame includes a rearward beam column extending downwardly from the upper beam structure and a rearward platform extending forwardly from a lower extent of the rearward beam, said rack structure extending between said rearward platform and the upper beam structure.
6. The combination of claim 1 including container supporting surfaces on the racks defining paths of container lateral movement in said channels and sloping downwardly from said one side of the frame to said opposite side of the frame.
7. The combination of claim 6, in which said surfaces are defined by rollers, there being gates at the lower ends of the channels to limit container travel in said channels.
8. The combination of claim 1, in which said means for supporting the rear portion of the frame includes ground engaging wheel structure, and pneumatic spring means and levers through which loading is transmitted from said rear portion of the frame to said wheels, said last named means including first and second pneumatic springs located at opposite sides of a vertical longitudinal plane bisecting said vehicle.
9. The combination of claim 2, wherein the rack structure is supported to be laterally removable off said supports.
10. The combination of claim 1 in which the upper beam structure includes two laterally spaced longitudinally extending, substantially parallel beams.
11. The combination of claim 1, wherein said beam structure has I-shaped cross-section and is of variable height along its length to provide a substantially constant movement of force loading along said length.
12. In a transport vehicle, the combination comprising
   an integral frame having upper beam structure elongated in the direction of vehicle travel and also having longitudinally spaced forward and rearward beam columns extending downwardly from the upper beam structure, the frame including laterally extending supports carried by the upper beam structure and at longitudinally spaced locations,
   means for supporting said forward and rearward beam columns during travel of the frame in said direction,
   said means including ground engaging wheels,
   and load carrying structure supported by said laterally extending supports in such suspended elevation between said forward and rearward beam columns that the bulk of the loading extended by said load carrying structure is carried by the upper beam structure.
13. The combination of claim 12 wherein said load carrying structure includes a load carrying platform, and including actuator means carried by said frame for raising and lowering said platform relative to the upper beam structure.

14. The combination of claim 12 wherein said load carrying structure includes lateral rail means suspended from said upper beam structure, and a carrier movable laterally on said rail means for laterally transporting loads onto and off the vehicle.

15. The combination of claim 12 wherein said load carrying structure includes at least one pallet, and a roller conveyor extending laterally at a higher elevation than the lower portion of the pallet.

16. The combination of claim 12 wherein the load carrying structure is supported by said laterally extending supports to be laterally removable therefrom.

References Cited

UNITED STATES PATENTS

| | | | |
|---|---|---|---|
| 3,399,794 | 9/1968 | Hummel | 296—28.2 X |
| 3,025,076 | 3/1962 | Davies. | |
| 1,973,030 | 9/1934 | Webber | 214—396 |
| 3,094,233 | 6/1963 | Kowalke | 214—394 |
| 2,540,803 | 2/1951 | Alexander | 214—394 |

PHILIP GOODMAN, Primary Examiner

U.S. Cl. X.R.

214—394